(12) United States Patent
Ohya

(10) Patent No.: US 6,675,595 B2
(45) Date of Patent: Jan. 13, 2004

(54) REFRIGERANT CYCLE SYSTEM INCLUDING TWO EVAPORATORS

(75) Inventor: Shigeki Ohya, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/242,638

(22) Filed: Sep. 13, 2002

(65) Prior Publication Data

US 2003/0051494 A1 Mar. 20, 2003

(30) Foreign Application Priority Data

Sep. 20, 2001 (JP) ........................... 2001-287312
Jun. 20, 2002 (JP) ........................... 2002-180153

(51) Int. Cl.$^7$ ............................... F25B 5/00; F25B 1/00
(52) U.S. Cl. ........................... 62/199; 62/228.5; 62/468
(58) Field of Search ................. 62/199, 228.5, 62/193, 184, 468, 504, 84, 197

(56) References Cited

U.S. PATENT DOCUMENTS 5,408,841 A * 4/1995 Fujiwara et al. ............... 62/192
5,435,144 A * 7/1995 Kalmbach ....................... 62/84
5,678,418 A * 10/1997 Ueno et al. .................... 62/200
6,145,325 A * 11/2000 Hanselmann et al. .......... 62/84
6,266,967 B1 7/2001 Honda ........................ 62/193

FOREIGN PATENT DOCUMENTS

JP   A-9-109656   4/1997
JP   A-11-123930  5/1999
JP   A-2000-2466  1/2000

* cited by examiner

Primary Examiner—Marc Norman
(74) Attorney, Agent, or Firm—Posz & Bethards, PLC

(57) ABSTRACT

A refrigerant cycle system includes a variable displacement compressor, and first and second evaporators disposed in parallel. In the refrigerant cycle system, it is determined whether a refrigerant flow amount from the compressor is in a low flow amount area when first and second blowers for blowing air to the first and second evaporators are operated at the same time. When it is determined that a predetermined time passes after the refrigerant flow amount is determined to be in the low flow amount area, the operation of the compressor is forcibly switched between a large discharge capacity and a small discharge capacity. Accordingly, it can prevent oil returning to the compressor from being short due to the operation of the compressor in the low flow amount area.

11 Claims, 7 Drawing Sheets

REFRIGERANT CYCLE SYSTEM INCLUDING TWO EVAPORATORS

CROSS-REFERENCE TO RELATED APPLICATION

This application is related to and claims priority from Japanese Patent Applications No. 2001-287312 filed on Sep. 20, 2001 and No. 2002-180153 filed on Jun. 20, 2002, the contents of which are hereby incorporated by reference.

BACKGROUND OF THE INVENTION

1. Field of the Invention

The present invention relates to a refrigerant cycle system including first and second evaporators disposed in parallel. The refrigerant cycle system is suitably used for a vehicle air conditioner including a front air-conditioning unit for performing air-conditioning operation for a front seat area in a passenger compartment, and a rear air-conditioning unit for performing air-conditioning operation for a rear seat area in the passenger compartment.

2. Description of Related Art

Recently, the market request for a minivan has been increased. In the minivan, since the capacity of a passenger compartment is large, a vehicle air conditioner is required to have a large air-conditioning capacity. Therefore, in some minivans, a dual-type air conditioner, where an air-conditioning unit is individually disposed for each of the front and rear seat sides in the passenger compartment, is used. In a refrigerant cycle system used for the dual-type air conditioner, two evaporator are provided, respectively, for the front and rear seat sides in the passenger compartment while a common compressor and a common condenser are used. However, a low-pressure side refrigerant pipe of the rear evaporator is generally disposed under a vehicle floor, and is lower than a position of a refrigerant suction pipe of a compressor by a distance, for example, approximately 600 mm, in many cases. Therefore, a lubricating oil is stored in the low-pressure side refrigerant pipe at an outlet of the rear evaporator, and an amount of the lubricating oil returned to the compressor becomes short, thereby generating lubrication failure in the compressor, and reducing durability of the compressor.

JP-A-9-109656 proposes a refrigerant cycle system including a main evaporator mainly used as the front evaporator, and an assistant evaporator selectively used as the rear evaporator. The main evaporator and the assistant evaporator are disposed in parallel. In the refrigerant cycle system, when a compressor is continuously operated for a predetermined time in the single operation of the main evaporator, the operation of the compressor is forcibly interrupted by a predetermined frequency to change the low-pressure side refrigerant pressure at the refrigerant suction side of the compressor, so that it prevents oil returned to the compressor from being short due to the single operation of the main evaporator. Further, a variable displacement compressor is used as the compressor, and a discharge capacity of the compressor is forcibly changed when the compressor is continuously operated for the predetermined time in the single operation. However, in this refrigerant cycle system, there is not described regarding a control for preventing the oil return shortage when the compressor is operated with a small capacity. Accordingly, in this refrigerant cycle system, when the refrigerant amount discharged from the compressor is made small, the amount of the lubricating oil returned to the compressor may become insufficient.

Further, in the refrigerant cycle system, when an electric compressor is used as the compressor and the discharge capacity of the compressor is controlled by controlling a rotation speed of its motor, the amount of the oil returned to the compressor becomes short when the rotation speed of the motor is decreased for reducing the flow amount of refrigerant in the refrigerant cycle system.

SUMMARY OF THE INVENTION

The present invention has been made in view of the above-described problems, and its object is to provide a refrigerant cycle system which prevents an oil amount returning to a compressor from being insufficient due to a small flow amount of refrigerant discharged from the compressor.

According to the present invention, in a reference cycle system, a compressor for compressing and discharging refrigerant is a variable type in which a flow amount of refrigerant discharged from the compressor is variable, first and second evaporators into which refrigerant circulates by operation of the compressor are disposed in parallel, a first blower is disposed for blowing air to the first evaporator, and a second blower is disposed for blowing air to the second evaporator. In the refrigerant cycle system, a control unit for controlling the operation of the compressor includes determining means for determining whether the flow amount of refrigerant discharged from the compressor is in a low flow area when both the first blower and the second blower are operated at the same time. Further, the control unit has control means for forcibly switching the flow amount of refrigerant discharged from the compressor between a first state where the flow amount of refrigerant discharged from the compressor is smaller than a first value in the low flow area, and a second state where the flow amount of refrigerant discharged from the compressor is larger than a second value that is larger than the first value, when the operation state in the low flow area is continued for a predetermined time after the determining means determines that the flow amount of refrigerant discharged from the compressor is in the low flow area. Accordingly, even when both the first and second evaporators are operated, the operation state of the compressor in the low flow area of refrigerant is continued for the predetermined time, the operation of the compressor can be forcibly switched between the first state and the second state. Therefore, the refrigerant flow amount can be rapidly increased. Thus, even when lubricating oil is stored in a low-pressure side refrigerant pipe due to the small refrigerant flow amount, the lubricating oil stored in the low-pressure side refrigerant pipe can be effectively returned to the compressor.

Preferably, the flow amount of refrigerant discharged from the compressor is variable from a minimum flow amount to a maximum flow amount, and the first value is about the minimum flow amount, and the second value is about the maximum flow amount. Therefore, the refrigerant amount can be accurately rapidly increased, and the lubricating oil can be readily pushed by the rapidly increased refrigerant amount. More preferably, the control means switches the operation of the compressor between the first state and the second state by plural times at predetermined time intervals. Therefore, the lubricating oil staying in the low-pressure side refrigerant pipe can be effectively introduced into the compressor.

When the compressor is a variable displacement compressor in which a discharge capacity is variable, the flow amount of refrigerant discharged from the compressor is changed by changing the discharge capacity of the compressor, and the determining means determines the low flow area of refrigerant based on a control electrical current applied to the compressor. Alternatively, when the compressor is an electrical compressor including a motor and a compression mechanism that is driven by the motor, the flow amount of refrigerant discharged from the compressor is changed by controlling a rotation speed of the motor. Alternatively, the control unit controls the operation of the compressor to reduce the flow amount of refrigerant discharged from the compressor as a cooling load reduces, and the determining means determines the low flow area of refrigerant based on information relative to the cooling load.

Preferably, the first evaporator is a main evaporator that is mainly used, the second evaporator is an assistant evaporator that is selectively used, and control unit includes assistant control means for forcibly switching the flow amount of refrigerant discharged from the compressor between the first state and the second state, when a single operation state, where the first blower is singly operated and the second blower is stopped, is continued for a predetermined time after the compressor is operated. Accordingly, even when the first blower is singly operated while the second blower is stopped, it can prevent the lubricating oil from becoming insufficient in the compressor.

The first evaporator and the first blower can be disposed in a front air conditioning unit for performing air-conditioning operation of a front seat area in a passenger compartment of a vehicle, and the second evaporator and the second blower can be disposed in a rear air conditioning unit for performing air-conditioning operation of a rear seat area in the passenger compartment of the vehicle. Even in this case, the present invention can be effectively applied.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Embodiments according to the present invention will be described hereinafter with reference to appended drawings.

First Embodiment

Figure 1:
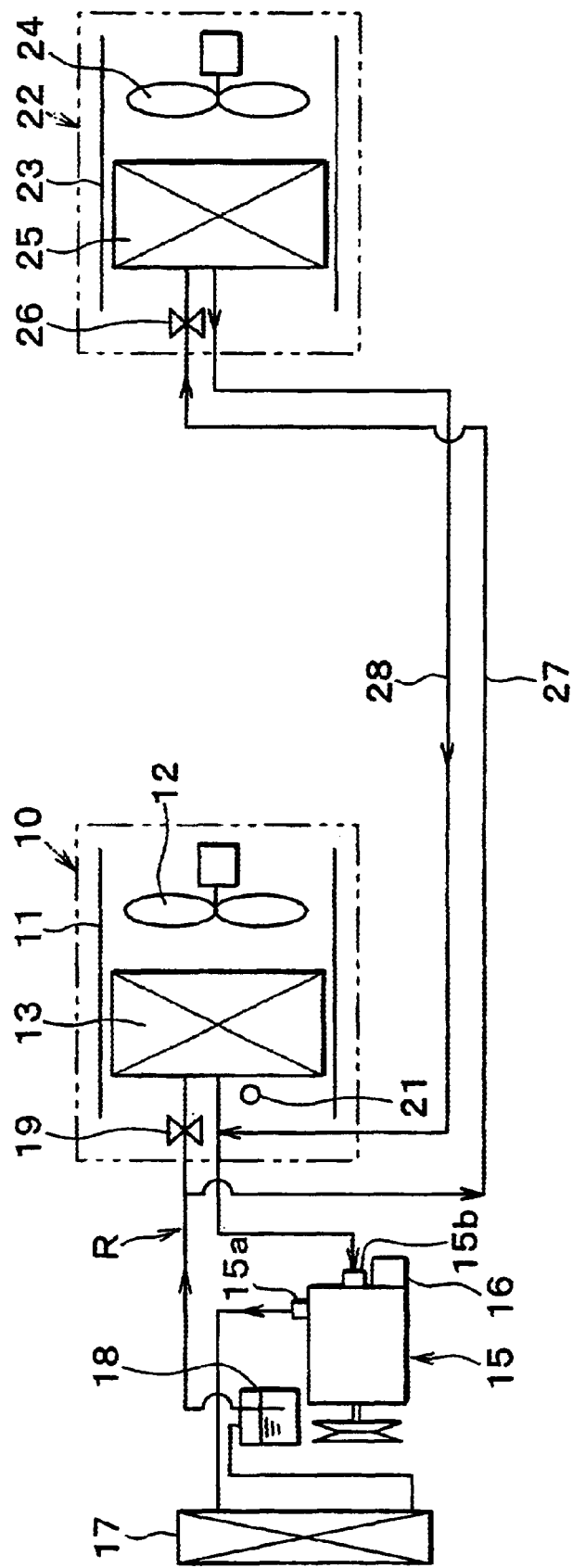
FIG. 1 is a schematic diagram showing a refrigerant cycle system for a vehicle air conditioner according to a first embodiment of the present invention.

In the first embodiment, a refrigerant cycle system R shown in FIG. 1 is typically used for a vehicle air conditioner. In the refrigerant cycle system, a front air-conditioning unit 10 shown in FIG. 1 is disposed inside a dashboard (not shown) at the most front side in the passenger compartment. The front air-conditioning unit 10 is for performing air-conditioning operation for a space at a front seat side in a passenger compartment of the vehicle. The front air-conditioning unit includes a case 11 defining an air passage through which air is blown toward the front seat side in the passenger compartment. A front blower 12 is disposed in the case 11 at an upstream air side. The front blower 12 blows inside air or/and outside air selectively introduced from an inside-outside air switching box (not shown). At a downstream air side of the front blower 12, a front evaporator (first evaporator) 13 of the refrigerant cycle system R is disposed as a cooling heat exchanger for cooling air blown by the front blower 12. The refrigerant cycle system R includes a compressor 15 driven by a vehicle engine (not shown) through a belt, a pulley and the like. In the first embodiment, a variable displacement compressor, capable of continuously changing a discharge capacity based on a control signal from the outside, is used as the compressor 15.

As the variable displacement compressor, for example, a swash plate compressor is used. The compressor 15 includes a variable displacement device 16 having a solenoid pressure-control device for controlling pressure in a swash plate chamber by using a discharge pressure of the compressor 15 and a suction pressure of the compressor 15. A swash angle of a swash plate is changed by controlling the pressure in the swash plate chamber using the variable displacement device 16, so that a piston stroke of the compressor 15, that is, a discharge capacity of the compressor 15 can be continuously changed in a range of approximate 0–100%.

Refrigerant is compressed by the compressor 15 so that a high-temperature high-pressure refrigerant is discharged from a discharge port 15a of the compressor 15. The high-pressure gas refrigerant discharged from the discharge port 15a of the compressor 15 is introduced into a condenser (radiator) 17. In the condenser 17, the high-pressure gas refrigerant is heat-exchanged with and radiates heat to outside air blown by a cooling fan (not shown), to be condensed. The refrigerant, having passed through the condenser 17, flows into a receiver 18, and is separated in the receiver 18 into liquid refrigerant and gas refrigerant. The liquid refrigerant is stored in the receiver 18, and is introduced into the front evaporator 13 after being decompressed.

The liquid refrigerant flowing from the receiver 18 is decompressed by a front thermal expansion valve 19 to low-pressure gas-liquid refrigerant. In the front evaporator 13, the low-pressure refrigerant flowing from the front thermal-expansion valve 19 is evaporated by absorbing heat from air to be blown into the passenger compartment. The front thermal expansion valve 19 is for automatically adjusting a valve open degree to maintain a supper-heating degree of refrigerant in an outlet of the front evaporator 13 at a predetermined degree. The front thermal expansion valve 19 includes a thermal sensing portion for detecting the temperature of refrigerant at the outlet of the front evaporator 13, a first pressure chamber, a second pressure chamber, and a diaphragm for partitioning the first and second chambers. Pressure, corresponding to the refrigerant temperature detected by the thermal sensing portion, is applied into the first pressure chamber, and the refrigerant pressure in the front evaporator 13 is applied into the second pressure chamber. In the front thermal expansion valve 19, the diaphragm and a valve body are displaced in accordance with a pressure difference between the first and second chambers and spring force of the diaphragm, so that a flow amount of refrigerant is adjusted. Refrigerant evaporated in the front evaporator 13 is again sucked into the compressor 15, and is compressed. In the refrigerant cycle system R, the compressor 15, the condenser 17, the receiver 18 and the like are disposed in an engine compartment positioned at a front side from the passenger compartment.

A temperature sensor 21 is disposed at a downstream air side of the front evaporator 13 within the case 11 of the front air-conditioning unit 10 to detect the air temperature (Te) directly after passing through the front evaporator 13. A discharge capacity of the compressor 15 is controlled in accordance with the air temperature flowing from the front evaporator 13, detected by the temperature sensor 21, thereby controlling the cooling capacity of the front evaporator 13. A heater core (not shown) for heating air using hot water, an air-mixing door (not shown) and the like are disposed at a downstream air side of the front evaporator 13 in the case 11 of the front air-conditioning unit 10. The air-mixing door is for adjusting the air temperature to be blown into the passenger compartment by adjusting a flow amount ratio of air (hot air) heated while passing through the heater core to air (cool air) bypassing the heater core. A defroster opening, a face opening and a foot opening (not shown) are provided at a most downstream air side in the case 11 of the front air-conditioning unit 10. The openings are opened and closed by an air outlet mode door (not shown), so that conditioned air is blown toward an inner surface of a windshield through the defroster opening, is blown toward the face portion of a passenger seated on the front seat through the face opening, and is blown toward the foot portion of the passenger through the foot opening.

Next, a rear air-conditioning unit 22 in the refrigerant cycle system will be described. The rear air-conditioning unit 22 is disposed at a vehicle rear side in the passenger compartment to perform air-conditioning operation for the rear seat side in the passenger compartment. The rear air-conditioning unit 22 includes a case 23 defining an air passage. In the case 23, a rear blower 24 for sucking and blowing inside air (i.e., air in the passenger compartment) is disposed at an upstream air side, and a rear evaporator (second evaporator) 25 is disposed at a downstream air side of the rear blower 24. A heater core (not shown) for heating air using hot water from the vehicle engine, and the like are disposed at a downstream side of the rear evaporator 25. In the rear air-conditioning unit 22, a rear face opening and a rear foot opening are provided at a downstream air end of the case 23. These rear openings are opened and closed by a rear air-outlet mode door (not shown), so that conditioned air is blown toward the head portion and the foot portion of a passenger in a rear seat of the passenger compartment from the rear opening through a rear face duct and a rear foot duct, respectively.

A rear thermal expansion valve 26 is provided at a refrigerant inlet side of the rear evaporator 25. The rear thermal expansion valve 26 has a structure similar to the front thermal expansion valve 19. That is, the rear thermal expansion valve 26 decompresses the high-temperature and high-pressure liquid refrigerant from the receiver 18 to gas-liquid low-pressure refrigerant. The rear thermal expansion valve 26 adjusts a valve open degree of a valve body, so that a supper-heating degree of refrigerant at an outlet of the rear evaporator 25 is set at a predetermined degree, and a flow amount of refrigerant is adjusted. In the refrigerant cycle system R, an inlet side of the rear thermal expansion valve 26 is connected to an inlet side pipe (i.e., high-pressure pipe) of the front thermal expansion valve 19 through an underfloor high-pressure pipe 27. An outlet side of the rear evaporator 25 is connected to an outlet side pipe (i.e., low-pressure pipe) of the front evaporator 13 through an underfloor low-pressure pipe 28. Therefore, in the refrigerant cycle system R, the rear evaporator 25 and the rear thermal expansion valve 26 are disposed in parallel to the front evaporator 13 and the front thermal expansion valve 19, respectively.

The underfloor high-pressure pipe 27 and the underfloor low-pressure pipe 28 are disposed in a space under a passenger-compartment floor, and are positioned lower than a suction port 15b of the compressor 15 by a predetermined distance (e.g., 600 mm), for example. The solenoid pressure-control device of the variable displacement device 16 of the compressor 15 changes the pressure in the swash plate chamber by using the discharge pressure of the compressor 15 and the suction pressure of the compressor. The solenoid pressure-control device of the compressor 15 includes a solenoid mechanism whose electromagnetic force is adjusted based on a control current In shown in FIG. 2, and a valve body that is displaced in accordance with a balance between the electromagnetic force of the solenoid mechanism and the suction pressure of the compressor 15. The pressure loss in a refrigerant passage through which the discharge pressure of the compressor 15 is introduced into the swash plate chamber, is adjusted by using the valve body, so that the pressure in the swash plate chamber can be adjusted.

Figure 2:
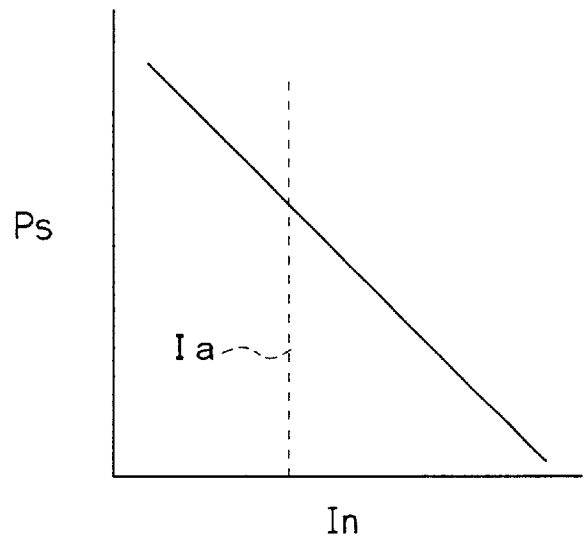
FIG. 2. is a graph showing control characteristics of a variable displacement compressor according to the first embodiment.
Figure 3:
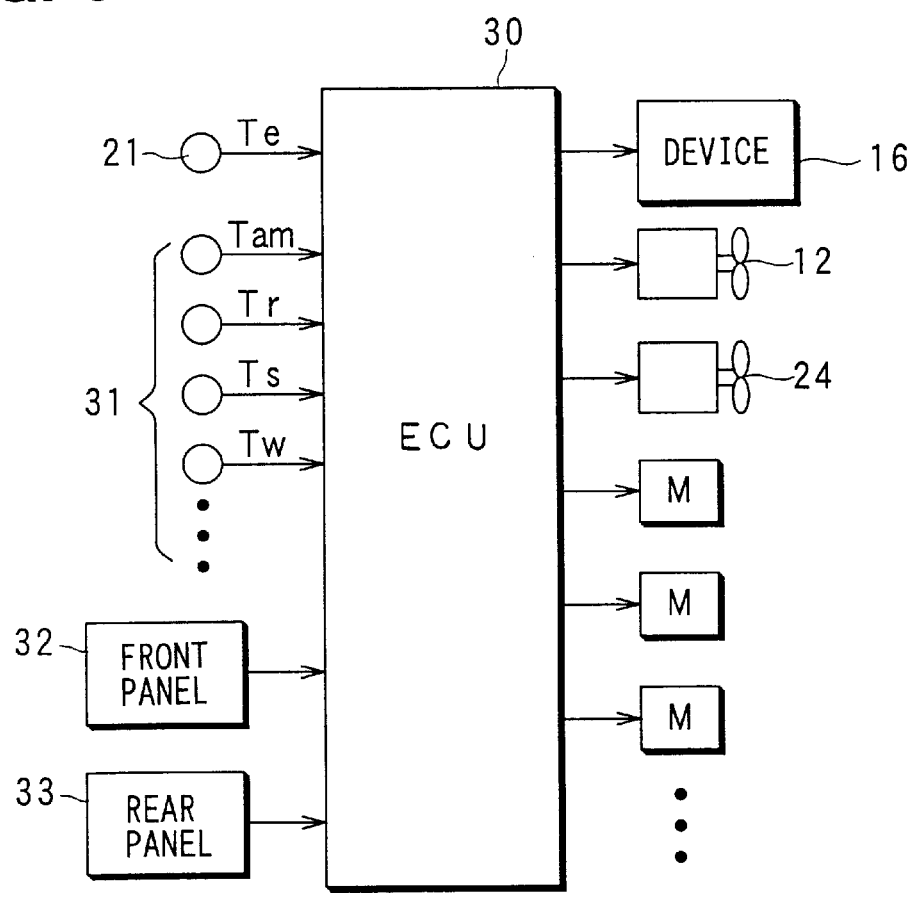
FIG. 3 is a schematic block diagram of an electronic control portion according to the first embodiment.

The electrical power supplied to the solenoid pressure-control device of the variable displacement device 16 is controlled based on output signal from an air-conditioning control unit (ECU) 30 shown in FIG. 3. For example, when the control current In is applied to the variable displacement device 16 is increased, the discharge capacity of the compressor 15 is increased. That is, the control current In applied to the variable displacement device 16 is for directly determining a target value of the suction pressure (lower side pressure) Ps of the compressor 15. As shown in FIG. 2, the suction pressure Ps is reduced in inversely proportional to an increase of the control current In. Therefore, when the control current In is increased, the discharge capacity of the compressor 15 is increased. Accordingly, the discharge capacity of the compressor 15, that is, the flow amount of refrigerant discharged from the compressor 15 is increased and reduced by increasing and reducing the control current In. Thus, an actual suction pressure Ps of the compressor 15 is adjusted, and cooling performance of the front evaporator 13 can be controlled so that the air temperature from the front evaporator 13 becomes a predetermined target temperature corresponding to target pressure of the suction pressure Ps. Here, the control current In can be changed by the duty control, but can be directly increased and reduced without the duty control.

In the first embodiment, because the discharge capacity of the compressor 15 can be reduced to around 0%, the compressor 15 does not include a solenoid clutch for performing ON-OFF operation. However, the compressor can include the solenoid clutch. In this case, when the discharge capacity is reduced to around 0%, operation of the compressor 15 can be stopped by stopping energization for the solenoid clutch.

In FIG. 3, the ECU 30 for controlling the operation of the refrigerant cycle system includes a microcomputer and its peripheral circuit. Detection signals such as an outside air temperature Tam, an inside air temperature Tr, a sunlight amount Ts, a water temperature Tw and the like detected by a sensor group 31, and a detection signal of an evaporator air temperature Te detected by the temperature sensor 21 are input to the ECU 30. Further, operation signals of a set temperature Tset, a set air-flowing amount, an inside-outside air mode switching, an air outlet mode switching, ON-OFF switching of the compressor 15 and the like are input from operation members on a front operation panel 32 to the ECU 30. At the rear seat side, operation signals of a rear air-flowing amount and a rear air-outlet mode switching and the like are input from operation members on a rear operation panel 33 to the ECU 30. Here, the operation signals for the rear seat side may be input from the front operation panel 32 to the ECU 30. The ECU 30 performs a predetermined operation control based on a predetermined program, and outputs control signals for controlling the operations of the air-conditioning components for the front and rear seat sides, such as the variable displacement device 16 and a motor group for driving the blowers 12, 24 and the likes.

Next, operation of the refrigerant cycle system including the front air-conditioning unit 10 and the rear air-conditioning unit 22 will be described in the above construction. When both of the front and rear air-conditioning units 10, 22 are operated, both of the front and rear blowers 12, 24 are operated to blow air in the cases 11 and 23. When an air-conditioning switch (compressor operation switch), provided as an operation member on the front operation panel 32, is turned on, the control current in applied to the variable displacement device 16 of the compressor 15 is calculated by the ECU 30 in the later-described method. Then, the compressor 15 is driven by the vehicle engine to have a discharge capacity.

Thus, in the front air-conditioning unit 10, air blown by the first blower 12 is cooled and dehumidified in the front evaporator 13, and the cooled air from the front evaporator 13 can be blown into a front-seat side space of the passenger compartment. Similarly, in the rear air-conditioning unit 22, air blown by the rear blower 24 is cooled and dehumidified in the rear evaporator 25, and the cooled air from the rear evaporator 25 can be blown into a rear-seat side space of the passenger compartment. When both of the air-conditioning units 10, 22 are operated at the same time as in the above manner, the front and rear thermal expansion valves 19, 26 are adjusted at the valve open degrees corresponding to cooling thermal loads of the front and rear evaporators 13, 25, respectively. Thus, refrigerant amounts corresponding to the cooling thermal loads of the front and rear evaporators 13, 25 always flow through the refrigerant passages of the front and rear evaporators 13, 25, respectively.

In a case where both of the air-conditioning units 10, 22 are operated at the same time, when the temperature of air sucked into each of the evaporators 13, 25 decreases and the cooling thermal load in the evaporators 13, 25 is decreased, the oil return shortage to the compressor 15 may be generated. That is, when the discharge capacity of the variable displacement compressor 15 is reduced, the flow amount of refrigerant circulated in the refrigerant cycle system R is reduced. As a result, the flow speed of refrigerant circulated in the refrigerant cycle system is reduced, and the lubricating oil contained in refrigerant is stored in the underfloor low-pressure pipe 28 that is located at the refrigerant outlet side of the rear evaporator 25, and the like. Accordingly, even when both the air-conditioning units 10, 22 are operated, the oil amount returned to the compressor 15 may be insufficient, sometimes.

When the single operation of the front air-conditioning unit 10 is performed while the rear blower 24 of the rear air-conditioning unit 22 is stopped, lubricating oil is stored in the underfloor low-pressure pipe 28 and the like, and the oil return shortage to the compressor 15 is generated for the following reason. In this case, because the air-blowing operation to the rear evaporator 25 is stopped, liquid refrigerant stored in the rear evaporator 25 is gradually evaporated. Then, when this evaporation of the refrigerant in the rear evaporator 25 is ended, the temperature of the rear evaporator 25 is increased to an atmospheric air temperature (i.e., air temperature in the passenger compartment).

Accordingly, the temperature of the thermal sensing portion of the rear thermal expansion valve 26 is also increased toward the atmospheric air temperature. Thus, a supper-heating degree of refrigerant at the outlet of the rear evaporator 25 is increased, and the rear thermal expansion valve 26 is opened at a very small open degree. In this case, low-pressure refrigerant, having passed through the rear thermal expansion valve 26, flows into the rear evaporator 25. As a result, liquid refrigerant is again evaporated in the rear evaporator 25, and the temperature (supper-heating degree of refrigerant) of the rear evaporator 25 is reduced, so that the rear thermal expansion valve 26 is again entirely closed after a short time passes. When the refrigerant evaporation is completed and the supper-heating degree of refrigerant is increased after the rear thermal expansion valve 26 is entirely closed, the rear thermal expansion valve 26 is opened again at a very small open degree.

As in this manner, in the front-side single operation of the front air-conditioning unit 10, the rear thermal expansion valve 26 is repeatedly opened and closed with a very small open degree. When the rear thermal expansion valve 26 is opened at a very small open degree, lubricating oil also flows into the rear evaporator 25 together with liquid refrigerant. At this time, refrigerant is evaporated in the rear evaporator 25, and the evaporated refrigerant is sucked into the compressor 15. However, the lubricating oil is not evaporated in the rear evaporator 25 due to its evaporating temperature much higher than the evaporating temperature of the liquid refrigerant. Further, the lubricating oil cannot be pushed out to a downstream refrigerant side by a very small flow of refrigerant generated due to the very small open degree of the rear thermal expansion valve 26. Therefore, lubricating liquid oil is stored in the rear evaporator 25 and the underfloor low-pressure pipe 28 at the outlet of the rear evaporator 25. Especially, since the underfloor low-pressure pipe 28 is generally disposed at a position lower than the suction port 15b of the compressor 15 by approximate 600 mm, the lubricating oil tends to be stored in the underfloor low-pressure pipe 28.

In the first embodiment, during both of the above same time operation of the air-conditioning units 10, 22 and the above single operation of the front air-conditioning unit 10, the discharge capacity of the compressor 15 is controlled so that the oil return shortage is prevented.

Figure 4:
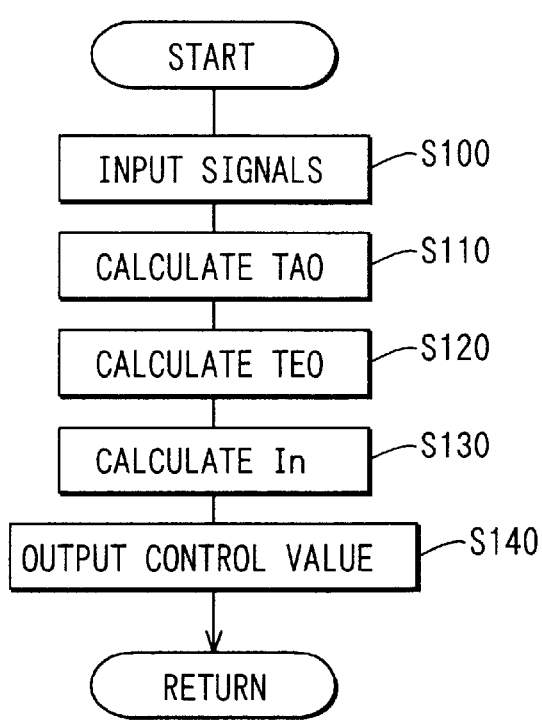
FIG. 4 is a flow diagram for controlling discharge capacity of the variable displacement compressor according to the first embodiment.

Next, the discharge capacity control of the compressor 15 will be described with reference to FIG. 4. The control routine shown in FIG. 4 is performed by the ECU 30, and is started by turning on the air-conditioning switch on the front operation panel 32. At step S100, the detection signals from the sensors 21, 31 and the operation signals from the operation panels 32, 33 are input to the ECU 30. At step S110, a target temperature TAO of air to be blown into the passenger compartment is calculated. The target air temperature TAO is an air temperature to be blown into the passenger compartment, required for maintaining an air temperature in the passenger compartment at a set temperature Tset. The set temperature Tset is set by a passenger in the passenger compartment using the front operation panel 32, regardless of air-conditioning load variation. The target air temperature TAO is calculated based on the set temperature Tset, the outside air temperature Tam, the inside air temperature Tr and the sunlight amount Ts entering into the passenger compartment.

At step S120, a target evaporator temperature TEO is calculated. The target evaporator temperature TEO is a target air temperature blown from the front evaporator 13. In the first embodiment, a first target evaporator temperature TEO1 is determined based on the target air temperature TAO, and a second target evaporator temperature TEO2 is determined based on the outside air temperature Tam. Further, a lower one among the first and second target evaporator temperatures TEO1, TEO2 is calculated as the target evaporator temperature TEO. That is, TEO=MIN (TEO1, TEO2). The first target evaporator temperature TEO1 is determined based on the target air temperature TAO in accordance with the graph shown in FIG. 5. Specifically, as the target air temperature TAO increases, the first target evaporator temperature TEO1 is set to be increased.

Figure 5:
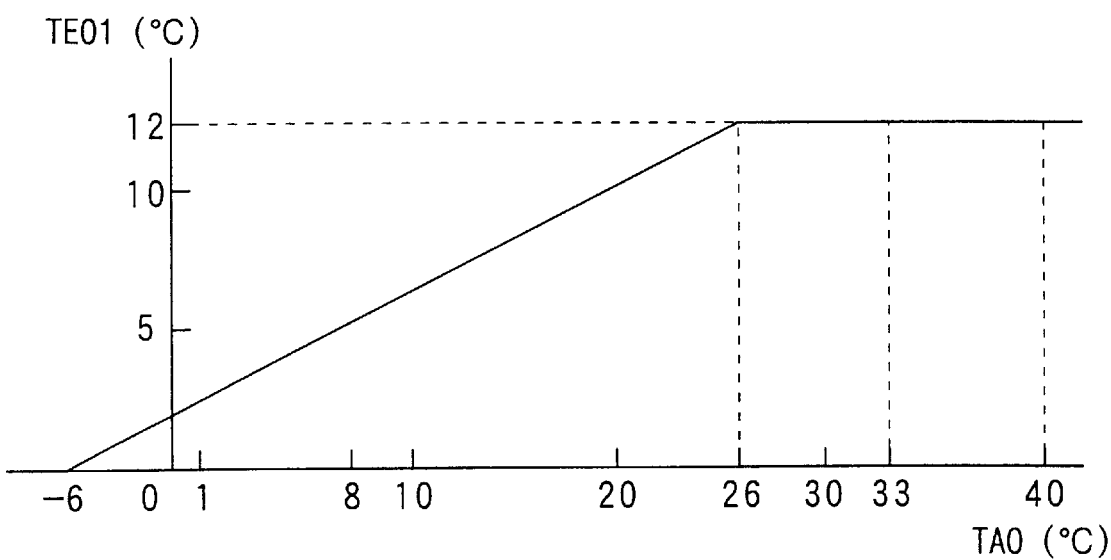
FIG. 5 is a characteristic graph showing the relationship between a first target evaporator temperature (TEO1) and a target air temperature (TAO) to be blown into a passenger compartment, according to the first embodiment.
Figure 6:
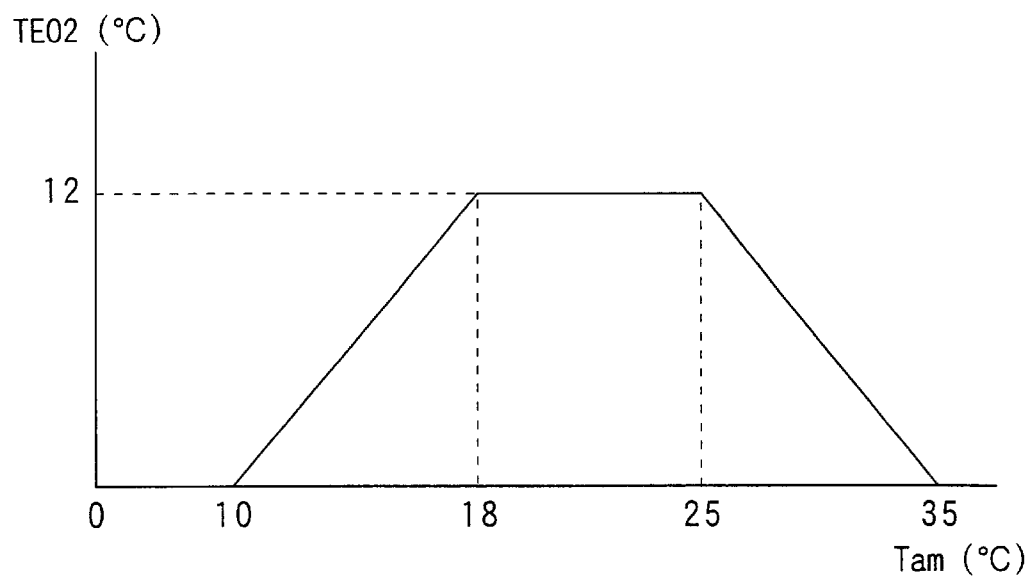
FIG. 6 is a characteristic graph showing the relationship between a second target evaporator temperature (TEO2) and an outside air temperature (Tam), according to the first embodiment.

Further, the second target evaporator temperature TEO2 is determined based on the outside temperature Tam in accordance with the graph shown in FIG. 6. Specifically, the request for the cooling operation and the dehumidifying operation is reduced in an intermediate temperature area of the outside temperature Tam (e.g., 18–25° C.). Therefore, in the intermediate temperature area, the second target evaporator temperature TEO2 is set higher (e.g., 12° C.), and the driving force for driving the compressor 15 is reduced, thereby saving motive power of the vehicle engine. In a high temperature area in the summer where the outside temperature Tam is higher than 25° C., for example, the second target evaporator temperature TEO2 is set to be reduced in inversely proportional to an increase of the outside temperature Tam, so cooling performance can be obtained. On the other hand, in a low temperature area where the outside temperature Tam is lower than 18° C., the second target evaporator temperature TEO2 is reduced in proportional to a decrease of the outside air temperature Tam, so that the dehumidifying performance can be obtained and it can prevent the windshield from being fogged. As shown in FIGS. 5, 6, an upper limit of the first and second target evaporator temperatures TEO1, TEO2 is set at 12° C. so that it can restrict an unpleasant odor from being generated at the front evaporator 13.

Next, at step S130 in FIG. 4, the control current In for controlling the discharge capacity is calculated. As shown in FIG. 2, the control current In is for determining the target value of the suction pressure Ps of the solenoid pressure control device of the variable displacement device 16 of the compressor 15. The control current In is determined so that an actual air temperature (actual evaporator temperature) Te blown from the front evaporator 13 becomes the target evaporator temperature TEO. Specifically, a deviation En (i.e., En=Te−TEO) between the actual evaporator temperature Te and the target evaporator temperature TEO is calculated. The control current In is calculated based on the deviation En by a feedback control method using proportional integral control (PI control). At step S140 in FIG. 4, the control current In is output to the variable displacement device 16 of the compressor 15, and the discharge capacity of the compressor 15 is controlled.

Figure 7:
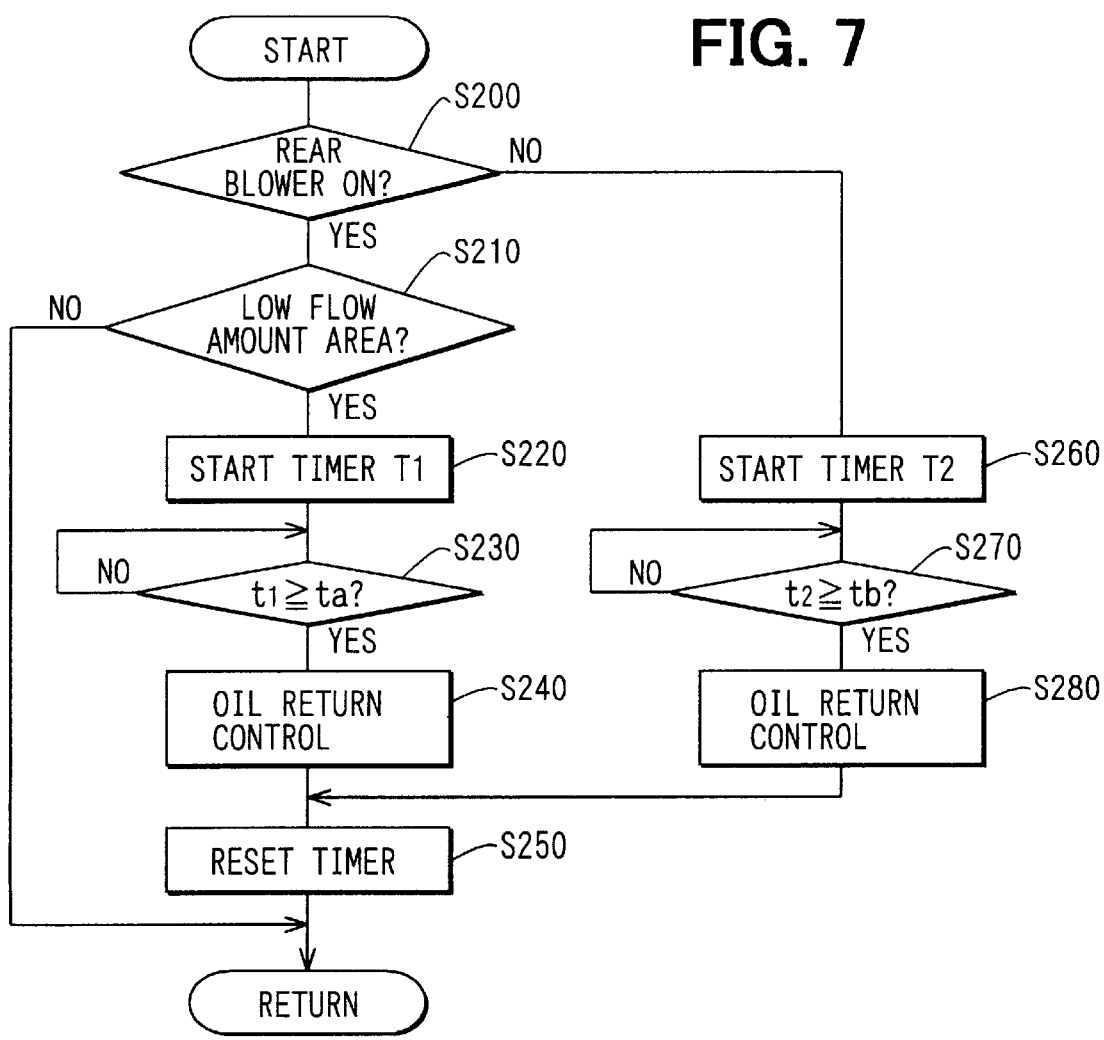
FIG. 7 is a flow diagram showing a discharge capacity control for returning lubricating oil to the variable displacement compressor, according to the first embodiment.

A control sub-routine shown in FIG. 7 is performed during the basic control shown in FIG. 4 at predetermined time intervals. At step S200, it is determined whether or not the rear blower 24 is operated. When the rear blower 24 is operated, it is determined that both of the front and rear air-conditioning units 10, 22 are operated at the same time in the sub-routine in FIG. 7. In this case, at step S210, it is determined whether or not a flow amount of refrigerant in the refrigerant cycle system R is in a low flow amount area. The flow amount of refrigerant in the refrigerant cycle system R is relative to the discharge capacity of the compressor 15, and the discharge capacity of the compressor 15 is relative to the control current In of the variable displacement device 16. Therefore, the determination at step S210 can be performed based on the control current In. More specifically, when the control current In is equal to or lower than a predetermined current Ia shown in FIG. 2, the flow amount of refrigerant in the refrigerant cycle system R is determined to be in the low flow amount area.

Figure 8:
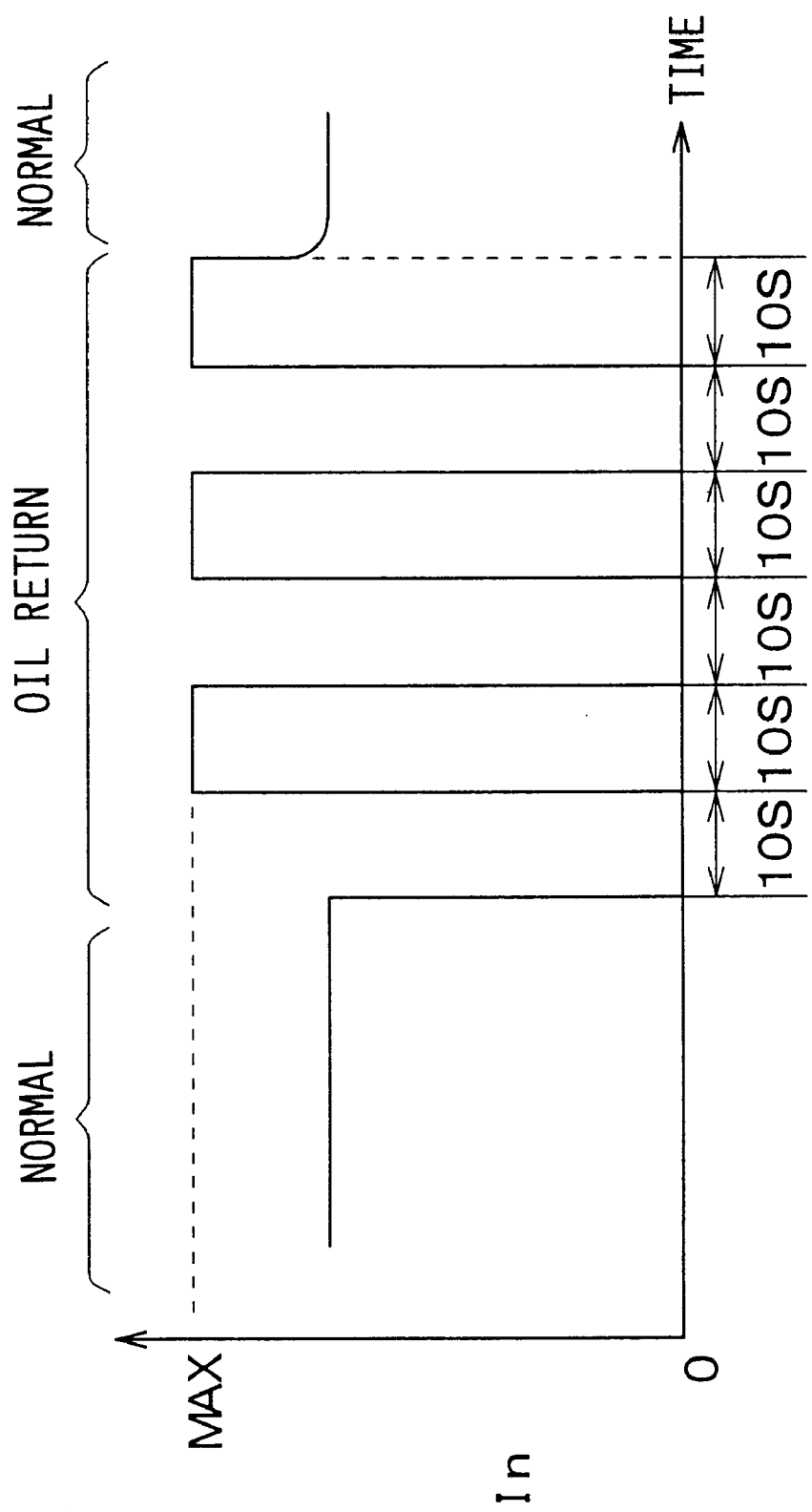
FIG. 8 is a graph showing control operation for returning lubricating oil to the variable displacement compressor, according to the first embodiment.

When the refrigerant flow amount is in the low flow amount area, time counting is started with a timer T1 at step S220. At step S230, it is determined whether or not a count time t1 of the timer T1 becomes equal to or longer than a first predetermined time ta. When the refrigerant cycle system R is operated with the low refrigerant flow amount while both the front and rear air-conditioning units 10, 22 are operated, a predetermined amount of the lubricating oil is stored in the underfloor low-pressure pipe 28 and the like for the first predetermined time ta. Here, until the predetermined amount of the lubricating oil is stored in the underfloor low-pressure pipe 28, the amount of the lubricating oil returned to the compressor 15 does not become short. The first predetermined time ta is determined by experiments for every refrigerant cycle system, and is a time of approximate 10–30 minutes, for example. When the count time t1 of the timer T1 becomes equal to or longer than the first predetermined time ta, oil return control is performed for returning the lubricating oil to the compressor, at step S240. Specifically, as shown in FIG. 8, the control current In is forcibly intermittently changed between a maximum current (MAX) and the zero current in the oil return control. More specifically, after the control current In is maintained at zero for 10 seconds (i.e., a period of 10S in FIG. 8), the control current In is maintained at the maximum current for 10 seconds. The control operation at the zero current and the control operation at the maximum current are alternately repeated by plural times (e.g., three times). Thereafter, a normal discharge capacity control is performed.

Figure 9:
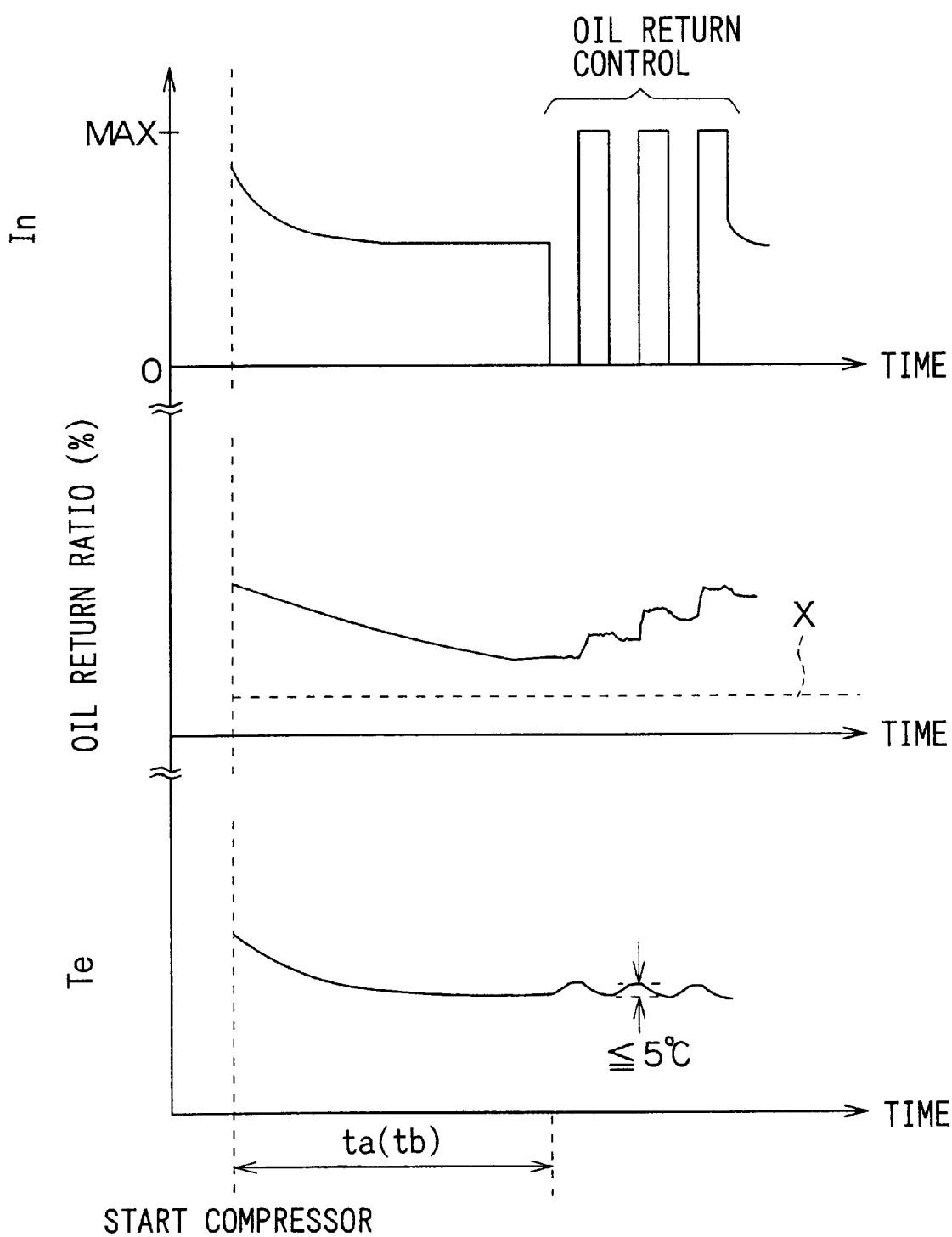
FIG. 9 is a time chart showing the discharge capacity control (In), an oil return ratio and an evaporator temperature (Te), according to the first embodiment.

Next, the discharge capacity control for returning the oil to the compressor 15 will be described with reference to FIG. 8. When the control current In is in a period of the zero current (In=0), the discharge capacity of the compressor 15 becomes a minimum capacity, and the amount of refrigerant circulated in the refrigerant cycle system R is rapidly reduced. In this case, refrigerant temperature at the outlets of the front and rear evaporators 13, 25 is increased, and the super-heating degree is increased. Therefore, the open degrees of the front and rear thermal expansion valves 19, 26 are increased. On the other hand, when the control current In is in a period of the maximum current (In=MAX), the discharge capacity of the compressor 15 becomes a maximum capacity, and the open degrees of the front and rear thermal expansion valves 19, 26 are beforehand increased, so that the amount of refrigerant circulated in the refrigerant cycle system R is rapidly increased. Accordingly, the lubricating oil, stored in the underfloor low-pressure pipe 28 and the like, can be pushed back toward the suction port 15b of the compressor 15 due to the rapid increase of the refrigerant flow amount. For example, when the rapid increase of the refrigerant flow amount is repeated three times as shown in FIGS. 8, 9, an oil return ratio in the refrigerant cycle system R can be step wise increased as shown in FIG. 9. Here, the oil return ratio is defined by the following formula (1).

$$\text{Oil Return Ratio} = \text{Oil Amount}/(\text{Oil Amount} + \text{Refrigerant Amount}) \times 100(\%) \quad (1)$$

In FIG. 9, a broken line X indicates a minimum value of the oil return ratio for ensuring an endurance quality of the compressor 15. The first predetermined time ta described in FIG. 7 is set so that oil return control is started before the oil return ratio in the refrigerant cycle system R is reduced to the minimum value. As shown in FIG. 9, the period for which the control current In is zero and the period for which the control current In is the maximum current are determined so that a temperature variation in air blown from the evaporator is within 5° C. Therefore, it can restrict air-conditioning feeling from being deteriorated due to the oil return control.

After the oil return control is performed at step S240 in FIG. 7, the timer T1 is reset at the step S250. When it is determined that the flow amount of refrigerant in the refrigerant cycle system R is not in the low flow amount area at step S210, that is, when the determination at step S210 is NO, the oil return control is not performed.

On the other hand, when it is determined that the rear blower 24 is not operated at step S200, that is, when the single operation of the front air-conditioning unit 10 is performed, time counting is started with a timer T2 at step S260. At step S270, it is determined whether or not a count time t2 of the timer T2 becomes equal to or longer than a second predetermined time tb. The second predetermined time tb is a time for which a predetermined amount of the lubricating oil is stored in the underfloor low-pressure pipe 28 and the like in the single operation of the front air-conditioning unit 10. The second predetermined time tb is determined by experiments for every refrigerant cycle system, and is set longer than the first predetermined time ta, for example, a time of approximate 30–120 minutes. When the count time t2 of the timer T2 becomes equal to or longer than the second predetermined time tb, the oil return control is performed for returning the lubricating oil at steps 280. The oil return control in the single operation of the front air-conditioning unit 10 is performed basically similar to the oil return control during the same time operation of the front and rear air-conditioning units 10, 22 shown in FIG. 8. That is, the refrigerant flow amount is rapidly increased intermittently by performing the oil return control, and the lubricating oil stored in the underfloor low-pressure pipe 28 and the like can be suitably returned toward the suction port 15b of the compressor 15. Accordingly, in the first embodiment of the present invention, it can accurately prevent the oil amount returning to the compressor 15 from being insufficient.

Second Embodiment

Figure 10:
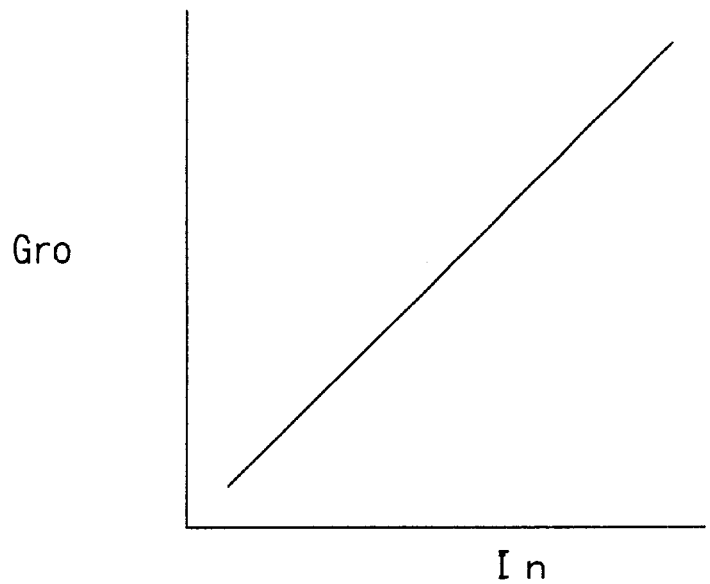
FIG. 10 is a graph showing control characteristics of a variable displacement compressor according to a second embodiment of the present invention.

In the variable displacement compressor 15 according to the above-described first embodiment, target value of the suction pressure Ps is set based on the control current In of the variable displacement device 16 as shown in FIG. 2, and the discharge capacity is changed so that the suction pressure Ps (low-pressure side refrigerant pressure) of the compressor 15 can be maintained at the target value. However, in the second embodiment, a target discharge amount Gro of refrigerant discharged from the compressor 15 is set based on the control current In of the variable displacement device 16 as shown in FIG. 10, and the discharge capacity of the compressor 15 is changed (adjusted) so that the discharge amount of the compressor 15 can be maintained at the target discharge amount Gro. Specifically, in the second embodiment, a throttle portion is provided at the discharge side of the variable displacement compressor 15. Here, a pressure difference generated between front and rear sides of the throttle portion is proportional to the discharge amount of the compressor 15. Accordingly, if the discharge capacity of the compressor 15 is changed so that the pressure difference therebetween becomes a target pressure difference, the discharge amount of the refrigerant discharged from the compressor 15 is maintained at the target discharge amount Gro.

In the second embodiment, the variable displacement device 16 of the compressor 15 includes a valve mechanism, and a solenoid mechanism for generating electromagnetic force that is determined by the control current In. The solenoid mechanism generates electromagnetic force corresponding to the target pressure difference. In the valve mechanism, a valve open degree is increased and reduced due to a balance between the electromagnetic force corresponding to the target pressure difference and the pressure difference between the front and rear sides of the throttle portion. Pressure in the swash plate chamber is controlled by changing the valve open degree of the valve mechanism, so that a swash angle of the swash plate is changed, and the discharge capacity of the compressor 15 can be continuously changed in a range of approximate 0–100%.

In the second embodiment, the other parts are similar to those of the above-described first embodiment. Accordingly, in the second embodiment, the advantages similar to the first embodiment can be obtained.

Third Embodiment

Figure 11:
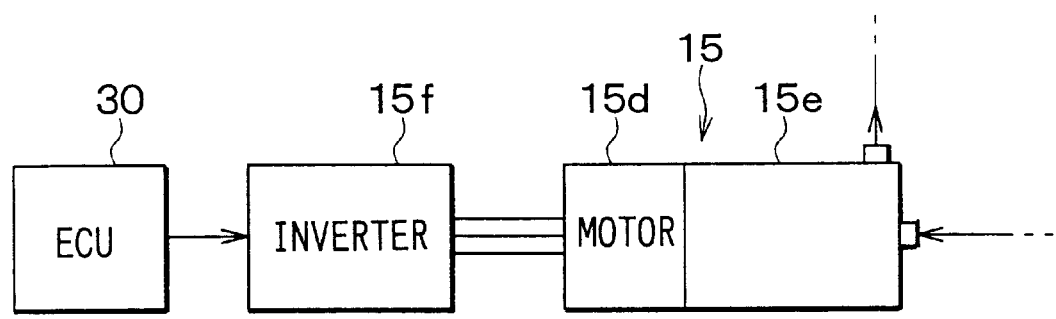
FIG. 11 is a control block diagram of an electric compressor according to a third embodiment of the present invention.

In the variable displacement compressor 15 according to the above-described first and second embodiments, the discharge capacity of the compressor 15 is changed, so that the flow amount of refrigerant discharged from the compressor 15 is changed. In the third embodiment, an electric compressor 15 shown in FIG. 11 is used. In the electric compressor 15, a motor 15d and a compression mechanism portion 15e driven by the motor 15d are integrated to each other. Specifically, the motor 15d is a three-phase alternating-current (AC) motor, and the compression mechanism portion 15e is a scroll compression mechanism. A frequency of a three-phase AC power source provided in the motor 15d is controlled by an inverter 15f, so that the rotational speed of the motor 15d is controlled. The flow amount of refrigerant discharged from the compressor 15 can be changed in accordance with the rotational speed of the motor 15d. The inverter 15f is controlled by the output signals from the ECU 30.

In the third embodiment, in the oil return control, a large discharge amount state due to a high rotational speed of the motor 15d and a small discharge amount state due to a low rotational speed of the motor 15d are forcibly alternately repeated at step S240, S280.

In the third embodiment, the other parts are similar to those of the above-described first embodiment. Accordingly, in the third embodiment, the advantages similar to the first embodiment can be obtained.

Other Embodiments

In the above-described first embodiment, at step S210 in FIG. 7, it is determined whether or not the flow amount of refrigerant in the refrigerant cycle system R is in the low flow amount area during the same time operation of the front and rear air-conditioning units 10, 22, only based on the control current In for the variable displacement device 16. However, the refrigerant flow amount in the refrigerant cycle system R is defined by the product of the discharge capacity of the compressor 15 and the rotational speed of the compressor 15. Therefore, when the determination of the low flow amount area at step S210 is performed based on the rotational speed information of the compressor 15 in addition to the control current In corresponding to the discharge capacity of the compressor 15, determination accuracy at step S210 can be improved. Here, since the compressor 15 is driven by the vehicle engine, an rotational speed of the vehicle engine can be used as the rotational speed information of the compressor 15.

Further, the low flow amount area of refrigerant in the refrigerant cycle system, that is, a small discharge capacity area of the variable displacement compressor 15, or a low rotational speed area of the electric compressor 15 is set when the cooling load in the evaporator is small. Therefore, the determination at step S210 can be performed based on information relative to the cooling load. Specifically, the determination at step S210 may be performed based on the temperature of air to be sucked to the front evaporator 13, the outside air temperature Tam, the inside air temperature Tr and the like. Here, when air to be sucked to the front evaporator 13 is inside air (inside air introduction mode), the inside air temperature Tr is used as the temperature of air sucked to the front evaporator 13. Alternatively, when air to be sucked to the front evaporator 13 is outside air (outside air introduction mode), the outside air temperature Tam is used as the temperature of air sucked to the front evaporator 13.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A reference cycle system comprising:
   a compressor for compressing and discharging refrigerant, the compressor being a variable type in which a flow amount of refrigerant discharged from the compressor is variable;
   first and second evaporators into which refrigerant circulates by operation of the compressor, the first and second evaporators being disposed in parallel;
   a first blower for blowing air to the first evaporator;
   a second blower for blowing air to the second evaporator; and
   a control unit for controlling the operation of the compressor, wherein:
   the control unit includes
   determining means for determining whether the flow amount of refrigerant discharged from the compressor is in a low flow area when both the first blower and the second blower are operated at the same time, and
   control means for forcibly switching the flow amount of refrigerant discharged from the compressor between a first state where the flow amount of refrigerant discharged from the compressor is smaller than a first value in the low flow area, and a second state where the flow amount of refrigerant discharged from the compressor is larger than a second value that is larger than the first value, when the operation state in the low flow area is continued for a predetermined time after the determining means determines that the flow amount of refrigerant discharged from the compressor is in the low flow area.

2. The refrigerant cycle system according to claim 1, wherein:
   the flow amount of refrigerant discharged from the compressor is variable from a minimum flow amount to a maximum flow amount; and
   the first value is about the minimum flow amount, and the second value is about the maximum flow amount.

3. The refrigerant cycle system according to claim 1, wherein:
   the compressor is a variable displacement compressor in which a discharge capacity is variable; and
   the flow amount of refrigerant discharged from the compressor is changed by changing the discharge capacity of the compressor.

4. The refrigerant cycle system according to claim 3, wherein the determining means determines the low flow area of refrigerant based on a control electrical current applied to the compressor.

5. The refrigerant cycle system according to claim 1, wherein:
   the compressor includes a motor, and a compression mechanism that is driven by the motor; and
   the flow amount of refrigerant discharged from the compressor is changed by controlling a rotation speed of the motor.

6. The refrigerant cycle system according to claim 1, wherein:
   the control unit controls the operation of the compressor to reduce the flow amount of refrigerant discharged from the compressor as a cooling load reduces; and
   the determining means determines the low flow area of refrigerant, based on information relative to the cooling load.

7. The refrigerant cycle system according to claim 1, wherein:
   the first evaporator is a main evaporator that is mainly used;
   the second evaporator is an assistant evaporator that is selectively used; and
   control unit includes assistant control means for forcibly switching the flow amount of refrigerant discharged from the compressor between the first state and the second state, when a single operation state, where the first blower is singly operated and the second blower is stopped, is continued for a predetermined time after the compressor is operated.

8. The refrigerant cycle system according to claim 7, wherein:
   the predetermined time, for which the single operation state, is continued after the compressor operates, is set longer than the predetermined time for which the operation state in the low flow area of refrigerant is continued while both the first and second blower are operated.

9. The refrigerant cycle system according to claim 1, wherein the control means switches the operation of the compressor between the first state and the second state by plural times at predetermined time intervals.

10. The refrigerant cycle system according to claim 1, wherein:

the first evaporator and the first blower are disposed in a front air conditioning unit for performing air-conditioning operation of a front seat area in a passenger compartment of a vehicle; and the second evaporator and the second blower are disposed in a rear air conditioning unit for performing air-conditioning operation of a rear seat area in the passenger compartment of the vehicle.

11. The refrigerant cycle system according to claim 10, wherein:

the second evaporator is coupled to the compressor through a refrigerant pipe; and the refrigerant pipe is disposed under a floor in the passenger compartment, at a position lower than that of a suction port of the compressor.

* * * * *